US010534825B2

(12) United States Patent
Mukherjee et al.

(10) Patent No.: US 10,534,825 B2
(45) Date of Patent: Jan. 14, 2020

(54) NAMED ENTITY-BASED DOCUMENT RECOMMENDATIONS

(71) Applicant: Microsoft Technology Licensing, LLC, Redmond, WA (US)

(72) Inventors: Kaustav Mukherjee, Hyderabad (IN); Vyankatesh Ramesh Gadekar, Hyderabad (IN); Pramod Nammi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 15/601,206

(22) Filed: May 22, 2017

(65) Prior Publication Data
US 2018/0336283 A1    Nov. 22, 2018

(51) Int. Cl.
G06F 17/30       (2006.01)
G06F 16/9535    (2019.01)
(Continued)

(52) U.S. Cl.
CPC ........ *G06F 16/9535* (2019.01); *G06F 16/322* (2019.01); *G06F 16/335* (2019.01);
(Continued)

(58) Field of Classification Search
None
See application file for complete search history.

(56) References Cited

U.S. PATENT DOCUMENTS 6,446,061 B1    9/2002    Doerre et al.
7,747,937 B2    6/2010    Rojer
(Continued)

FOREIGN PATENT DOCUMENTS

CN    103678620 A    3/2014
WO    2009052308 A1    4/2009

OTHER PUBLICATIONS

Liang, et al., "Personalized Content Recommendation and User Satisfaction: Theoretical Synthesis and Empirical Findings," In Journal of Management Information Systems, vol. 23, Issue 3, 2006, pp. 45-70.
(Continued)

*Primary Examiner* — Hung D Le
(74) *Attorney, Agent, or Firm* — NovoTechIP International PLLC

(57) ABSTRACT

In some examples, a facility chooses documents for recommendation to people interested in a distinguished subject. The facility accesses a data resource indicating, for each of a plurality of documents, (1) a subject semantically determined for the document, (2) a number of people who have interacted with the document, and (3) an aggregate level of intensity with which those people have interacted with the document. Based on contents of the data structure, the facility identifies one or more documents (1) for which the distinguished subject has been semantically determined, and (2) with which a relatively large number of people have interacted and/or with which people have interacted with a high aggregate level of intensity. The facility transmits to another computing system data configured to cause the first computing system to present a recommendation for some or all of the identified documents.

15 Claims, 10 Drawing Sheets

(51) Int. Cl.
*G06F 16/38* (2019.01)
*G06F 16/31* (2019.01)
*G06F 16/954* (2019.01)
*G06F 16/335* (2019.01)
*G06F 16/35* (2019.01)

(52) U.S. Cl.
CPC ............ *G06F 16/355* (2019.01); *G06F 16/38* (2019.01); *G06F 16/954* (2019.01)

(56) References Cited

U.S. PATENT DOCUMENTS

| | | | |
|---|---|---|---|
| 8,352,496 | B2 | 1/2013 | Johnston |
| 8,402,032 | B1* | 3/2013 | Brunsman .............. G06F 17/278 707/748 |
| 8,612,435 | B2 | 12/2013 | Sambrani et al. |
| 9,135,344 | B2 | 9/2015 | Mason et al. |
| 9,235,812 | B2 | 1/2016 | Scholtes |
| 9,268,868 | B2 | 2/2016 | Jang |
| 9,384,285 | B1 | 7/2016 | Ding et al. |
| 9,501,467 | B2 | 11/2016 | Light et al. |
| 9,710,544 | B1 | 7/2017 | Smith et al. |
| 2006/0277455 | A1 | 12/2006 | Yamada et al. |
| 2007/0124291 | A1 | 5/2007 | Hassan et al. |
| 2008/0052262 | A1* | 2/2008 | Kosinov ............ G06F 16/9032 |
| 2009/0300547 | A1 | 12/2009 | Bates et al. |
| 2010/0153324 | A1 | 6/2010 | Downs et al. |
| 2010/0185691 | A1* | 7/2010 | Irmak ................... G06F 16/353 707/803 |
| 2011/0055186 | A1* | 3/2011 | Gopalakrishnan ........................... G06F 16/9535 707/706 |
| 2011/0270606 | A1 | 11/2011 | Crochet et al. |
| 2012/0278268 | A1* | 11/2012 | Hamalainen ........ G06F 16/9535 706/46 |
| 2012/0296637 | A1 | 11/2012 | Smiley et al. |
| 2013/0238631 | A1 | 9/2013 | Carmel et al. |
| 2013/0346421 | A1* | 12/2013 | Wang ................. G06F 16/3346 707/748 |
| 2014/0025671 | A1* | 1/2014 | Marlow ................ G06F 3/0484 707/727 |
| 2015/0066959 | A1 | 3/2015 | Yi et al. |
| 2015/0199333 | A1 | 7/2015 | Nekhay |
| 2016/0062983 | A1* | 3/2016 | Jung ..................... G06F 17/278 704/9 |
| 2016/0171507 | A1* | 6/2016 | Fanous ............... G06F 16/9535 705/7.29 |
| 2016/0253679 | A1 | 9/2016 | Venkatraman et al. |
| 2016/0357820 | A1 | 12/2016 | Murrett et al. |

OTHER PUBLICATIONS

"Entity Linking Intelligence Service," https://www.microsoft.com/cognitive-services/en-us/entity-linking-intelligence-service, Retrieved on: Feb. 28, 2016, 7 pages.

"Goose-Extractor 1.0.25", Retrieved From https://pypi.org/project/goose-extractor/, Retrieved on Jan. 23, 2017, 6 Pages.

Benz, et al., "Automatic Bookmark Classification: A Collaborative Approach", In Proceedings of the 2nd Workshop on Innovations in Web Infrastructure, vol. 76, May 22, 2006, 8 Pages.

Cheekula, et al., "Entity Recommendations Using Hierarchical Knowledge Bases", In Proceedings of 4th Workshop on Knowledge Discovery and Data Mining Meets, May 31, 2015, 12 Pages.

Gruetze, et al., "CohEEL: Coherent and Efficient Named Entity Linking Through Random Walks", In Web Semantics: Science, Services and Agents on the World Wide Web, vol. 37, Mar. 2, 2016, pp. 75-89.

Hu, et al., "Entity Hierarchy Embedding", In Proceedings of the 53rd Annual Meeting of the Association for Computational Linguistics and the 7th International Joint Conference on Natural Language Processing, vol. 1, Jul. 26, 2015, 9 Pages.

"International Search Report and Written Opinion Issued in PCT Application No. PCT/US2018/026387", dated Jul. 10, 2018, 11 Pages.

"International Search Report and Written Opinion Issued in PCT Application No. PCT/US2018/028983", dated Jul. 19, 2018, 13 Pages.

Yasavur, et al., "Ontology-Based Named Entity Recognizer for Behavioral Health", In Proceedings of the 26th International Florida Artificial Intelligence Research Society Conference, May 19, 2013, pp. 249-254.

"Non Final Office Action Issued in U.S. Appl. No. 15/497,164", dated Oct. 7, 2019, 29 Pages.

* cited by examiner

| document id | category | user id | interaction score | |
|---|---|---|---|---|
| 105979621 | Arcade Games | 86884013 | 0.17 | 711 |
| 453789465 | Arcade Games | 86884013 | 0.21 | 712 |
| 458998765 | Arcade Games | 86884013 | 0.11 | 713 |
| 557964378 | Arcade Games | 86884013 | 0.12 | 714 |
| 787895315 | Arcade Games | 86884013 | 0.21 | 715 |
| 235875136 | Australian History | 86884013 | 0.55 | 716 |
| 541258969 | Diamond Mining | 86884013 | -0.50 | 717 |
| 205054253 | Greek History | 86884013 | 0.86 | 718 |
| 541315241 | Greek History | 86884013 | 0.88 | 719 |
| 846761834 | Greek History | 86884013 | 0.43 | 720 | local interaction table — 700

FIG. 8 global interaction table — 800

| document id | category | user id | interaction score | |
|---|---|---|---|---|
| 541258969 | Diamond Mining | 86884013 | -0.50 | 811 |
| 732154310 | Diamond Mining | 65438443 | 0.98 | 812 |
| 732154310 | Diamond Mining | 76543215 | 0.97 | 813 |
| 732154310 | Diamond Mining | 91532104 | 0.99 | 814 |
| 205054253 | Greek History | 86884013 | 0.86 | 815 |
| 205054253 | Greek History | 12231553 | 0.22 | 816 |
| 312654321 | Greek History | 44558877 | 0.23 | 817 |
| 312654321 | Greek History | 56320054 | 0.92 | 818 |
| 312654321 | Greek History | 66545654 | 0.96 | 819 |
| 312654321 | Greek History | 75555315 | 0.92 | 820 |
| 541315241 | Greek History | 86884013 | 0.86 | 821 |
| 541315241 | Greek History | 75555315 | 0.18 | 822 |
| 675465984 | Greek History | 61524511 | 0.05 | 823 |
| 675465984 | Greek History | 75555315 | 0.16 | 824 |
| 846761834 | Greek History | 86884013 | 0.43 | 825 |

801  802  803  804

NAMED ENTITY-BASED DOCUMENT RECOMMENDATIONS

BACKGROUND

A variety of kinds of electronic documents contain text, such as web pages, word processing documents, slide show documents, spreadsheet documents, graphic design documents, note-taking documents, scientific and mathematical papers, etc.

In some cases, when a user reads one or more electronic textual documents, these are used as a basis for recommending other documents to the user. One conventional approach to formulating such recommendations is to identify a word or phrase common among the titles of documents read by the user, and/or a word or phrase that occurs a large number of times in the body of one or more documents read by the user. In these conventional approaches, a search engine is use to find additional documents that have this word or phrase in their title, and/or have many occurrences of this word or phrase in their bodies. These documents are then recommended to the user.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

In some examples, the facility provides a method in a first computing system for choosing documents for recommendation to people interested in a distinguished subject, the method comprising, in the first computing system: accessing a data resource indicating, for each of a plurality of documents, (1) a subject semantically determined for the document, (2) a number of people who have interacted with the document, and (3) an aggregate level of intensity with which those people have interacted with the document; based on contents of the data structure, identifying one or more documents (1) for which the distinguished subject has been semantically determined, and (2) with which a relatively large number of people have interacted and or with which people have interacted with a high aggregate level of intensity; and transmitting to a second computing system distinct from the first computing system data configured to cause the first computing system to present a recommendation for some or all of the identified documents.

BRIEF DESCRIPTION OF THE DRAWINGS

FIG. 7 is a data structure diagram showing a sample local interaction table maintained by the facility in some examples to track interactions by a user with different documents.

FIG. 8 is a data structure diagram showing a sample global interaction table maintained by the facility in some examples to track interactions by users in a population of users with different documents

DETAILED DESCRIPTION

Figure 1:
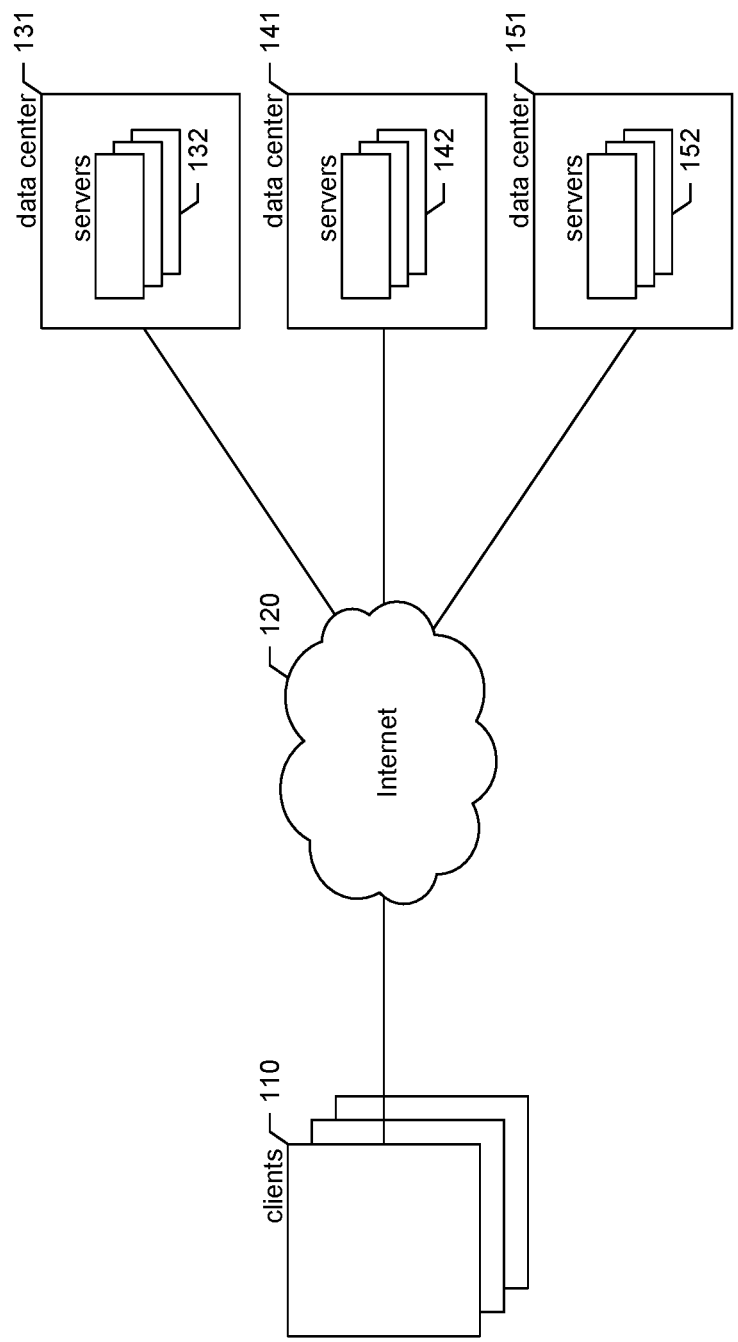
FIG. 1 is a network diagram showing the environment in which the facility operates in some examples.

The inventors have recognized significant disadvantages in the conventional approaches to recommending documents described above. In particular, they rely on the prominent use of the same word or phrase in both the documents read and the documents recommended. The inventors have recognized that such approaches will fail to recommend documents that use a synonym, hypernym, or hyponym of a word or phrase used in read documents. They have also recognized that two documents that both relate to the same overarching idea without mentioning it—e.g., a first document directed to elections and a second document directed to lobbying that both relate to the overarching subject of politics without either overtly mentioning it—will not be connected for the purpose of making a recommendation.

In response to recognizing the foregoing disadvantages, the inventors have conceived and reduced to practice a software and/or hardware facility for named entity-based document recommendations ("the facility"). In some examples, the facility recommends web page documents to a user based upon that user's interactions with other web page documents in a browser. In a variety of examples, the facility recommends documents of a variety of other types to a user based upon that user's interactions of a variety of types with documents of a variety of types.

For a particular user, the facility monitors the user's interaction with documents, recording information about the nature and/or intensity of these interactions. For each document interacted with by the user, the facility uses the textual content of the document to semantically discern a subject of the document. Among the documents interacted with by the user, the facility selects as likely important to this user a first certain set of subjects that (1) are attributed to a large fraction of these interacted-with documents, and/or (2) are attributed to documents that were the subject of a high-intensity interactions by the user.

To recommend new documents likely of interest to the user in each of the selected subjects, the facility analyzes document interaction data collected on a potentially large population of users. This cross-user document interaction data indicates each case in which a particular user has interacted with a particular document at a particular level of intensity. For each selected subject, the facility selects documents semantically discerned to be directed to the subject that have been interacted with by a relatively large number of users at a relatively high level of intensity. The facility causes the selected documents to be presented as recommendations to the user, such as in a browser window.

In some examples, the facility discerns a subject of a document by identifying named entities referenced in the document, and analyzing entity relationship graphs each specifying relationships between one of these referenced named entities and other named entities related to the referenced named entity. The named entities whose references the facility identifies in the document are ways of referring to real-world objects, such as the names of people, organizations, or locations; the names of substances or biological species; other "rigid designators;" expressions of times, quantities, monetary values, or percentages; etc. For each named entity referenced in the document, the facility retrieves or constructs an entity relationship graph: a data structure specifying direct and indirect relationships between the referenced named entity and other, more general named entities related to the referenced one. In each entity relationship graph, the referenced named entity is described as the "root" of the graph. The facility compares the entity relationship graphs for the named entities in a document, and selects as the subject of the document an entity that occurs in all or most of these entity relationship graphs, at a relatively short average distance from their roots. (As the distance of entities from the root increases, the entities grow increasingly more general and less specific, and less strongly related to the referenced entity at the graph's root.)

In some cases, when attempting to discern the subject of the document, the facility identifies two or more subjects having levels of frequency and intensity in the entity relationship graphs for the document that make them similarly likely to be the best subject for the document. In some examples, in such cases, the facility treats the document as having multiple subjects. In some examples, the facility selects as the document's subject the one of these candidate subjects that is ascribed to the most documents intensively interacted with by the users who interacted with this document.

By performing some or all of the ways described above, the facility efficiently recommends documents highly likely to be relevant and interesting to a user, even in cases where one or more recommended documents failed to contain keywords matching those in documents previously read by the user.

Also, by performing in some or all of the ways described above and storing, organizing, and accessing information relating to document interactions and recommendations in an efficient way, the facility meaningfully reduces the hardware resources needed to store and exploit this information, including, for example: reducing the amount of storage space needed to store the information relating to document interactions and recommendation; and reducing the number of processing cycles needed to store, retrieve, or process the information relating to document interactions and recommendation. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to document interactions and recommendation with less latency, producing a better user experience and allowing users to do a particular amount of work in less time.

FIG. 1 is a network diagram showing the environment in which the facility operates in some examples. The network diagram shows clients 110 each typically being used by different user. Each of the clients execute software enabling its user to interact with documents, such as a browser enabling its user to interact with web page documents. Software on the client also enables the client to monitor and/or analyze this document interaction activity by the user. The clients are connected by the Internet 120 and/or one or more other networks to data centers such as data centers 131, 141, and 151, which in some examples are distributed geographically to provide disaster and outage survivability, both in terms of data integrity and in terms of continuous availability. Distributing the data center geographically also helps to minimize communications latency with clients in various geographic locations. Each of the data centers contain servers, such as servers 132, 142, and 152. Each server can perform one or more of the following: serving content and/or bibliographic information for documents; storing document interaction information for all of the users in a population of users; and determining, for a particular subject, documents most likely to be interesting in that subject.

While various examples of the facility are described in terms of the environment outlined above, those skilled in the art will appreciate that the facility may be implemented in a variety of other environments including a single, monolithic computer system, as well as various other combinations of computer systems or similar devices connected in various ways. In various examples, a variety of computing systems or other different devices are used as clients, including desktop computer systems, laptop computer systems, automobile computer systems, tablet computer systems, smart phones, personal digital assistants, televisions, cameras, etc.

Figure 2:
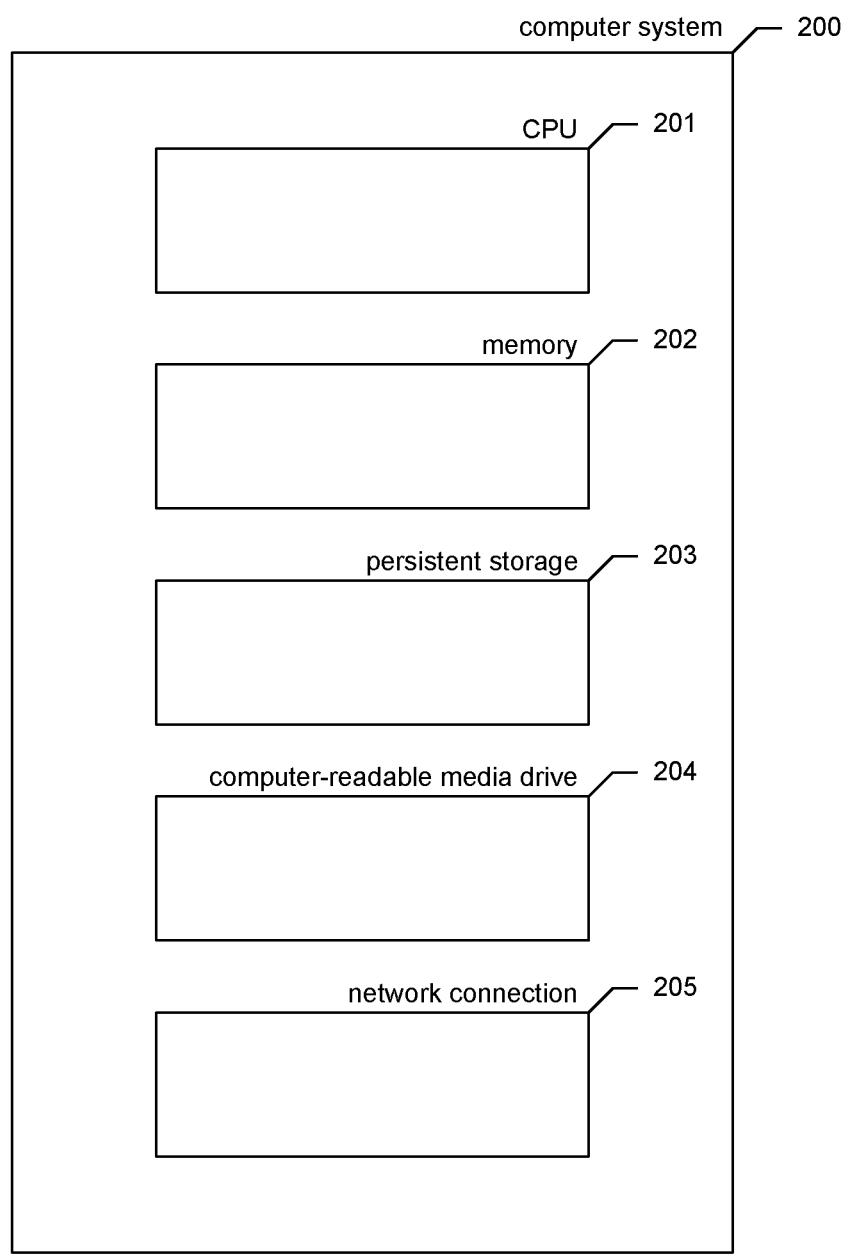
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various examples, these computer systems and other devices 200 can include server computer systems, desktop computer systems, laptop computer systems, netbooks, mobile phones, personal digital assistants, televisions, cameras, automobile computers, electronic media players, etc. In various examples, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
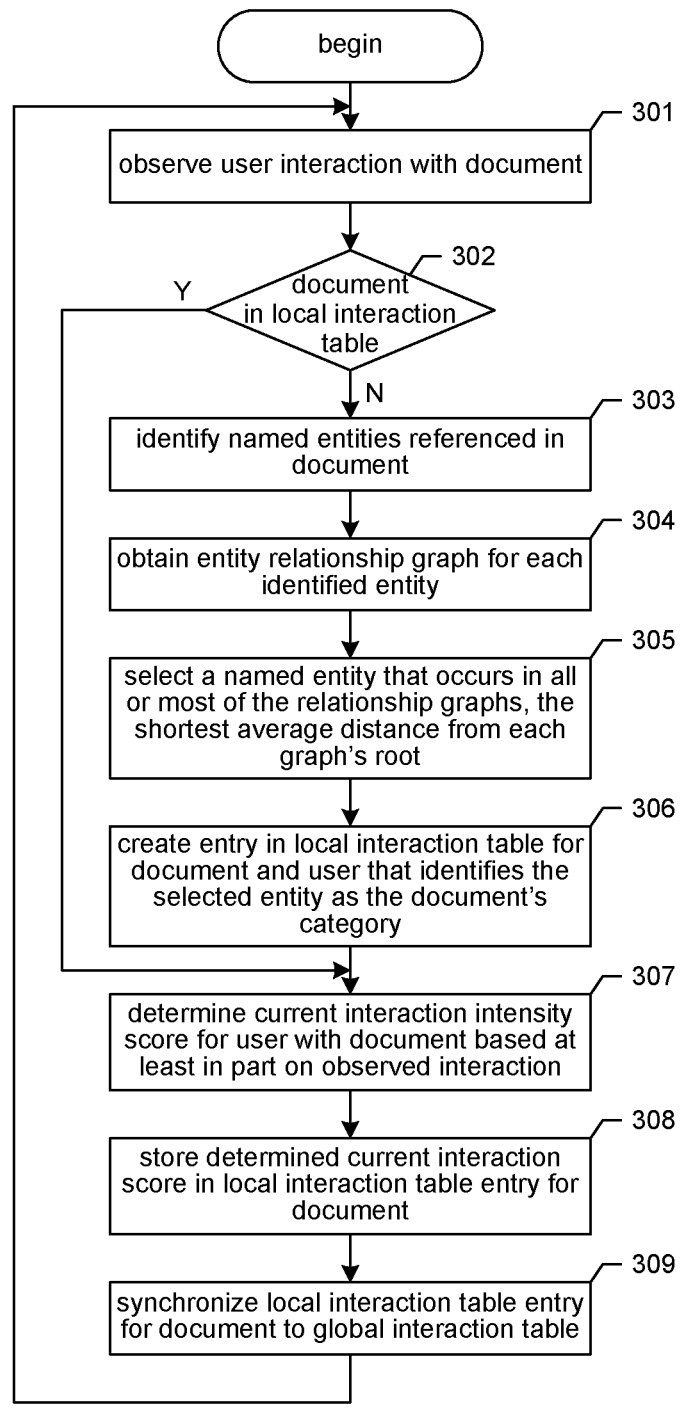
FIG. 3 is a flow diagram showing a process performed by the facility to monitor and record document interaction information in some examples.

FIG. 3 is a flow diagram showing a process performed by the facility to monitor and record document interaction information in some examples. At 301, the facility observes a user interaction with a document. In various examples, such interaction can constitute, for example, selecting the document from a list of documents; retrieving contents of the document; displaying some or all of the document; scrolling the document; gaze-traversing the displayed document in a reading pattern; zooming the displayed document in or out; accessing bibliographic or other ancillary information for the document; bookmarking or unbookmarking the document; adding the document to a reading list or removing it from a reading list; rating the document; paying to obtain additional rights to the document; paying the author of the document as a matter of tribute; annotating or otherwise commenting on the document; authoring and/or publishing a review of the document; revising the document; creating a derivative document based on the document; sharing the document with another user; publishing or republishing the document; hiding or unhiding a tab containing the document; closing the document; etc.

At 302, if the document is already included in a local interaction table reflecting earlier document interactions by this user, then the facility continues at 307, else the facility continues at 303. At 303, the facility identifies some or all of the named entities referenced in the document. At 304, the facility obtains an entity relationship graph for each identified entity. In some examples, this involves retrieving an existing entity relationship graph for an identified entity. In some examples, this involves constructing an entity relationship graph for an identified entity. For example, in some examples, the facility uses a service such as MICROSOFT SATORI from MICROSOFT CORPORATION to return parent entities of a queried entity, as follows: (1) the facility establishes the identified entity as the root of the entity relationship graph; (2) the facility queries for parent entities of the identified entity, and adds then to the entity relationship graph as parents of the root; and (3) for each of the parents added to the entity relationship graph, the facility recursively queries for their ancestors and adds them to the entity relationship graph until no more ancestors of the root remain to be added to the entity relationship graph.

Figure 4:
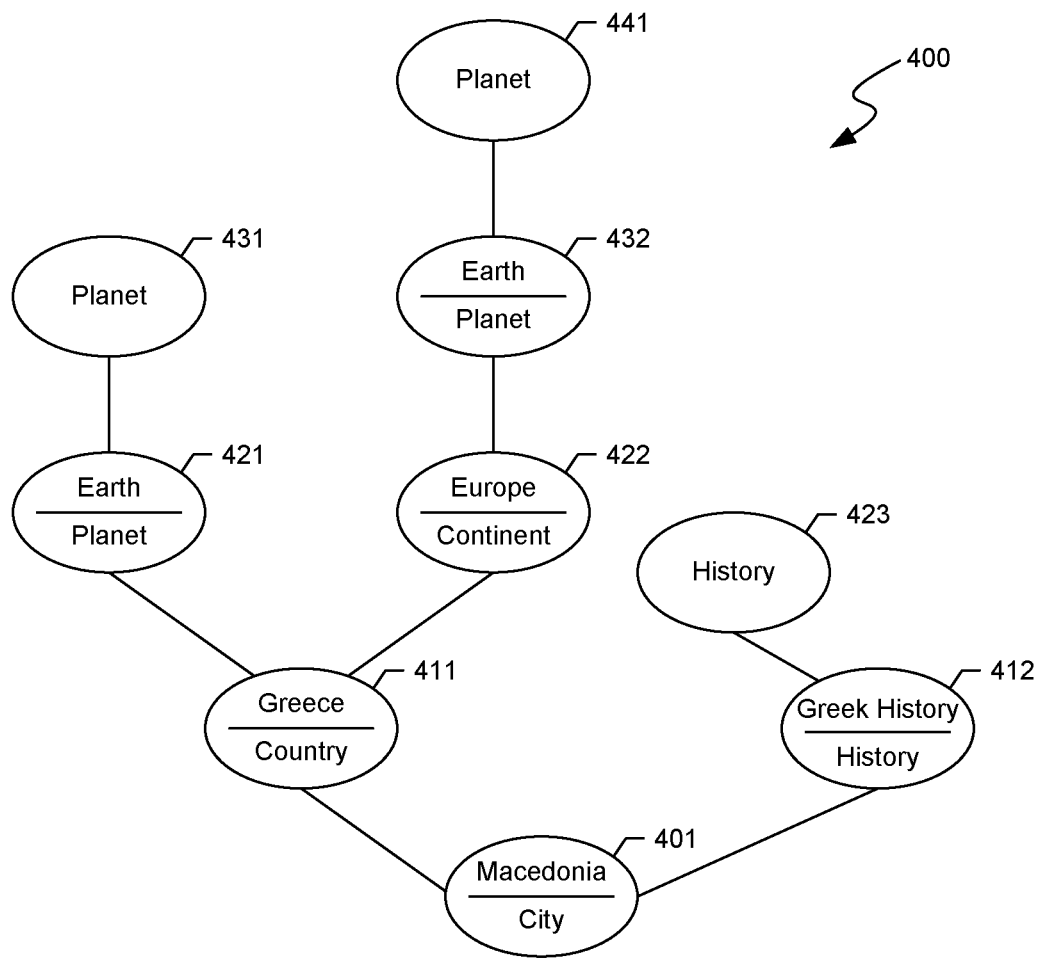
FIG. 4 is a graph diagram showing a sample entity relationship graph for the named entity "Macedonia" retrieved or constructed by the facility in some examples.
Figure 5:
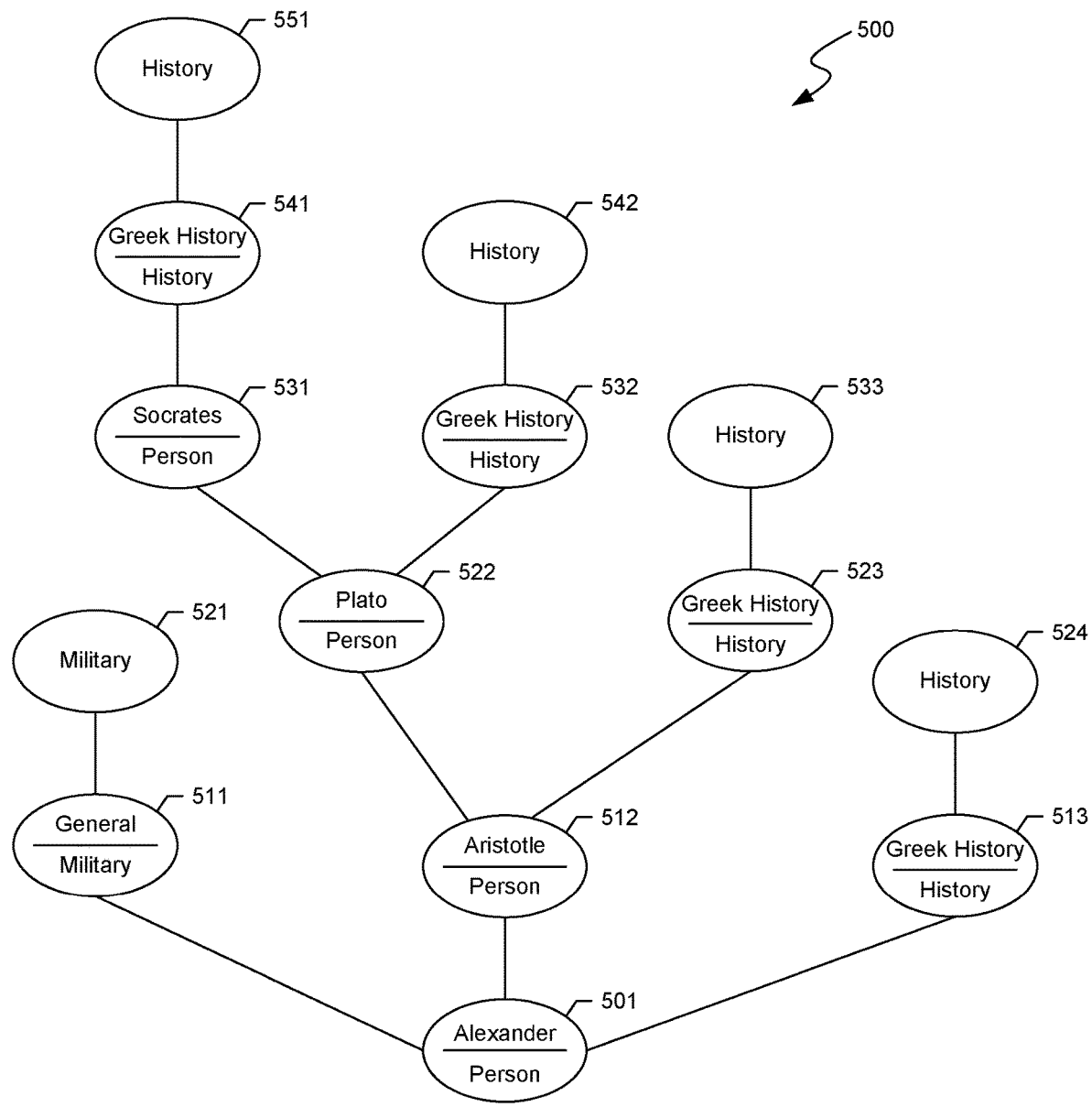
FIG. 5 is a graph diagram showing a sample entity relationship graph for the named entity "Alexander" retrieved or constructed by the facility in some examples.
Figure 6:
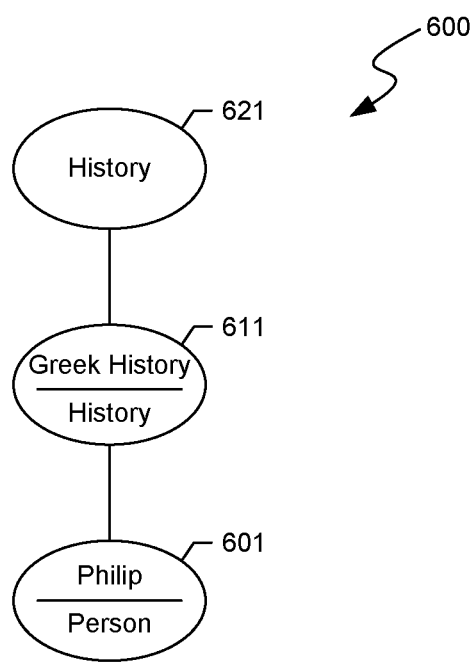
FIG. 6 is a graph diagram showing a sample entity relationship graph for the named entity "Philip" retrieved or constructed by the facility in some examples.

FIGS. 4-6 show sample entity relationship graphs for named entities "Macedonia," "Alexander," and "Philip," respectively, all named entities referenced by the same document identified in act 303.

FIG. 4 is a graph diagram showing a sample entity relationship graph for the named entity "Macedonia" retrieved or constructed by the facility in some examples. In entity relationship graph 400, root node 401 indicates that "Macedonia" is a city entity. Parent nodes 411 and 412 of root node 401 indicate, respectively, that "Greece" is a country entity and "Greek History" is a history entity. The only parent entity returned for node 412 is a "History" entity 423, which itself has no parent nodes. Node 411, on the other hand, has two parent entities: an "Earth" planet entity 421, and a "Europe" continent entity 422. The only parent entity of node 421 is "Planet" entity 431, which itself has no parents. The only parent of node 422 is "Earth" planet entity 432, whose only parent is "Planet" entity 441, which itself has no parents. In some examples (not shown) the facility includes only a single instance of each entity node in an entity relationship graph; in such examples, nodes 421 and 432 are consolidated into a single "Earth" planet node, which is the parent of both node 411 and node 422. The single consolidated "Earth" planet node itself has a single parent, a "Planet" node consolidated from nodes 431 and 441.

FIG. 5 is a graph diagram showing a sample entity relationship graph for the named entity "Alexander" retrieved or constructed by the facility in some examples. By comparing entity relationship graph 500 for the named entity "Alexander" shown in FIG. 5 to entity relationship graph 400 for the named entity "Macedonia" shown in FIG. 4, it can be seen that they contain two of the same entities: a "Greek History" history entity, e.g., nodes 412 and 513; and a "History" entity, e.g. nodes 423 and 524.

FIG. 6 is a graph diagram showing a sample entity relationship graph for the named entity "Philip" retrieved or constructed by the facility in some examples. By comparing entity relationship graph 600 for the named entity "Philip" shown in FIG. 6 to entity relationship graph 400 for the named entity "Macedonia" shown in FIG. 4 and entity relationship graph 500 for the named entity "Alexander" shown in FIG. 5, it can be seen that the only entity intersections among the three entity relationship graphs are the same two: a "Greek History" history entity, e.g., nodes 412, 513, and 611; and a "History" entity, e.g. nodes 423, 524, and 621.

Returning to FIG. 3, at 305, the facility selects the named entity that occurs in all or most of the relationship graphs obtained at 304 that is the shortest average distance from the root of each entity relationship graph. Among the two entities identified above is occurring in all three graphs, the "Greek History" history entity and the "History" entity, the "Greek History" history entity has the shorter distance from the root node of each graph, and thus is selected by the facility. In some cases, when attempting to discern the subject of the document, the facility identifies two or more subjects having levels of frequency and intensity in the entity relationship graphs for the document that make them similarly likely to be the best subject for the document. In some examples, in such cases, the facility treats the document as having multiple subjects. In some examples, the facility selects as the document's subject the one of these candidate subjects that is ascribed to the most documents intensively interacted with by the users who interacted with this document.

At 306, the facility creates a new entry in the local interaction table for the document in the user interacting with it that identifies the entity selected at 305 as the document's category. In some cases, the document's category selected by the facility is called by other names, including the document's "subject," its "topic," its "focus," its "primary entity," etc.

At 307, the facility determines a current interaction intensity score for the local user with the document based at least in part on the interaction observed at 301. In various examples, the facility considers various factors in determining the score, including the type of the interaction observed at 301; an amount of time that elapsed before the interaction was performed; an amount of time during which the interaction was performed; a speed, pressure, or tone of voice with which the interaction is performed; etc. In some cases, the score determined by the facility for interaction is negative, reflecting perceived aversion by the user to the document in particular, and possibly also to the subject determined for the document. In some examples, where the local interaction table contains an existing interaction intensity score for the document, the facility simply replaces the existing score with the new one based entirely on the most recent interaction observed at 301. In some examples, the facility generates a current score by combining the existing score contained in the local interaction table with a score based upon the most recent interaction observed at 301, such as by computing an average of these two scores in which the two scores are weighted evenly. At 308, the facility stores the current interaction score determined at 307 in the local interaction table entry for the document.

FIG. 7 is a data structure diagram showing a sample local interaction table maintained by the facility in some examples to track interactions by a user with different documents. The local interaction table 700 is made up of rows, such as rows 711-720, each corresponding to a different document with which the local user has interacted. Each row is divided into the following columns: a document ID column 701 containing a document identifier identifying the document; a category column 702 identifying the category or subject selected for the document; a user ID column 703 containing a user identifier identifying the local user; and in interaction score column 704 containing an interaction score characterizing the intensity of the local user's interaction with the document. For example, row 718 indicates that the local user, having user identifier 86884013, interacted with the document having document identifier 205054253, directed to the subject of "Greek History," with an intensity of 0.86 out of a maximum possible intensity of 1.00. In some examples (not shown), instead of or in addition to storing and interaction intensity score for each document, the facility stores information describing some or all of the interactions, including, for example, interaction type, interaction duration, etc.

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown; etc.

Returning to FIG. 3, at 309, the facility synchronizes the local interaction table entry for the document to a global interaction table containing document interaction information for all of the users of a particular user population. After 309, the facility continues act 301 to observe the local user's next interaction with any document.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 8 is a data structure diagram showing a sample global interaction table maintained by the facility in some examples to track interactions by users in a population of users with different documents. The global interaction table 800 is made up of rows, such as rows 811-825, each corresponding to a different combination of a user and a document with which that the user interacted. As in local interaction table 700 shown in FIG. 7, each row is divided into the following columns: a document ID column 801; a category column 802; a user ID column 803; and an interaction score column 804 containing in interaction score characterizing the intensity of the local user's interaction with the document. In some cases, the documents identified in document ID column 801 of the global interaction table are referred to as a "corpus" of documents within which the facility can recommend particular documents.

Figure 9:
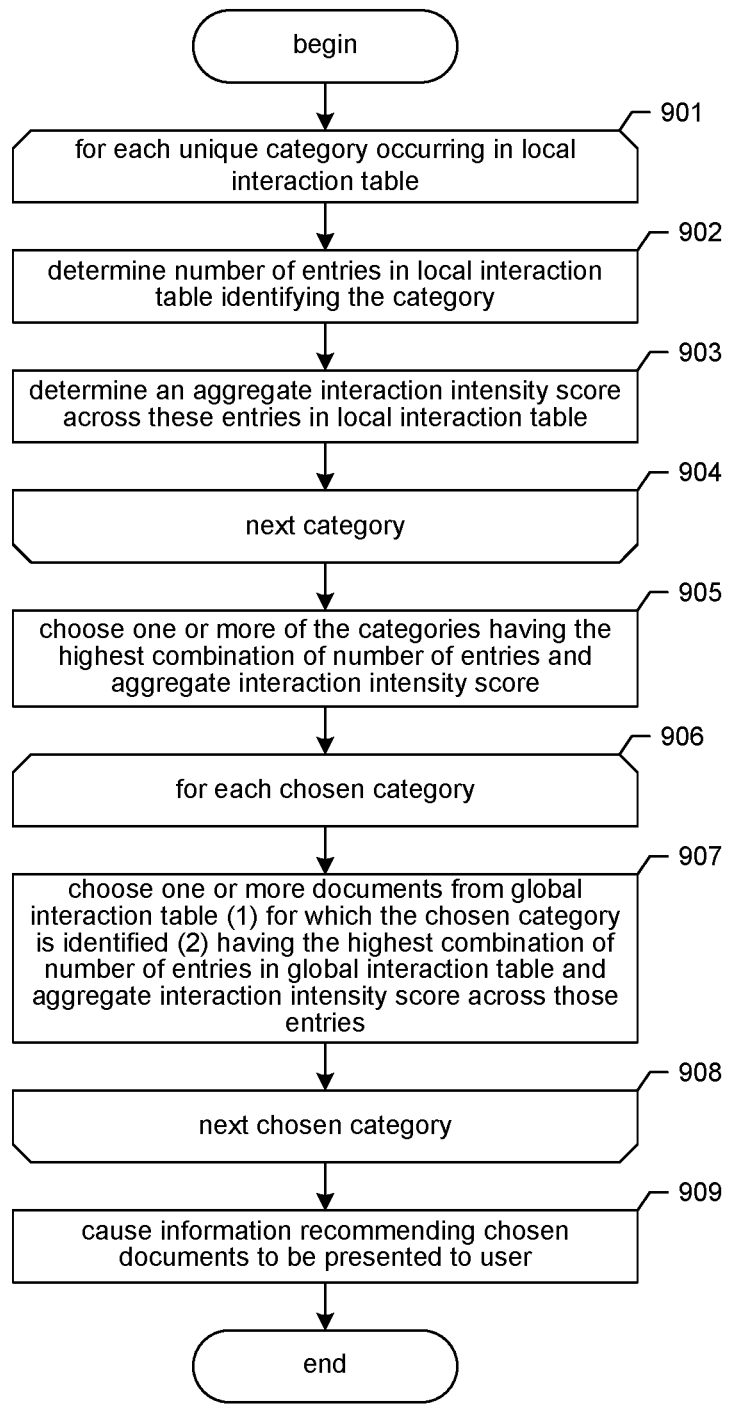
FIG. 9 is a flow diagram showing the process performed by the facility in some examples to recommend documents to a particular user.

FIG. 9 is a flow diagram showing the process performed by the facility in some examples to recommend documents to a particular user. At 901-904, the facility loops through each unique category represented in the local interaction table that contains information about this user's document interactions. In the state of local interaction table 700 shown in FIG. 7, four unique categories occur: "Arcade Games" (rows 711-715), "Australian History" (row 716), "Diamond Mining" (row 717), and "Greek History" (rows 718-720). Thus, in this state, at 901-904, the facility loops through the four unique categories listed above. At 902, the facility determines the number of entries in the local interaction table identifying the current category. For the "Arcade Games" category, the local interaction table contains five entries; for the "Australian History" category, the local interaction table contains one entry; for the "Diamond Mining" category, the local interaction table contains one entry; and for the "Greek History" category, the local interaction table contains three entries. At 903, the facility determines an aggregate interaction intensity score across the entries in the local interaction table identifying the current category. In various examples, the facility uses a variety of aggregation functions to produce this aggregate interaction intensity score, such as mean, median, mode, $75^{th}$ or another percentile, etc. Using the median aggregation function, the facility determines the following aggregate interaction intensity scores: for the "Arcade Games" category, 0.17; for the "Australian History" category, 0.55; for the "Diamond Mining" category, −0.50; and for the "Greek History" category, 0.86. At 904, if additional unique categories remain to be processed, than the facility continues at 901 to process the next category, else the facility continues at 905.

At 905, the facility chooses one or more of the unique categories that have the highest combination of number of entries determined at 902 and aggregate interaction intensity score determined at 903. In some examples, the facility does so by generating a rating for each unique category that is based on both number of entries and aggregate interaction intensity score. In some examples, the facility generates this rating by multiplying the number of entries by the aggregate interaction intensity score. In some examples, the facility generates the rating in a way that emphasizes the importance of aggregate interaction intensity score over number of entries, such as by multiplying the number of entries by the square of the aggregate interaction intensity score. In pursuing this last approach, the facility generates the following ratings for the four unique categories: for the "Arcade Games" category, $5*(0.17)^{\wedge}2=0.14$; for the "Australian History" category, $1*(0.55)^{\wedge}2=0.30$; for the "Diamond Mining" category, $1*(-0.50)^{\wedge}2=0.25$; and for the "Greek History" category, $3*(0.86)^{\wedge}2=2.22$. Because 2.22 is the largest of these category ratings, the facility chooses the "Greek History" category.

At 906-908, the facility loops through each category chosen at 905. At 907, the facility chooses one or more documents from the global interaction table each having the following properties: (1) the document has the current category, and (2) the document has the highest combination of (a) number of entries in the global interaction table (i.e., number of users of the population who have interacted with the document) and (b) aggregate interaction intensity score across the centuries. For the chosen "Greek History" category, the global interaction table contains five documents: those having the document identifiers 205054253 (rows 815-816), 312654321 (rows 817-820), 541315241 (rows 821-822), 675465894 (rows 823-824), and 846761834 (row 825). Employing a document rating approach matching the category rating approach described above, the document ratings are: for the document having document identifier 205054253, $2*(0.53)^{\wedge}2=0.56$; for the document having document identifier 312654321, $4*(0.92)^{\wedge}2=3.39$; for the document having document identifier 541315241, $2*(0.52)^{\wedge}2=0.54$; for the document having document identifier $675465894=2*(0.105)^{\wedge}2=0.02$, and for the document having document identifier 846761834, $1*(0.43)=0.18$. Because 3.39 is the largest of these document ratings, the facility chooses the document having document identifier 312654321.

At 908, if additional chosen categories remain to be processed, then the facility continues at 906 to process the next chosen category, else the facility continues at 909. At 909, the facility causes information recommending the documents chosen at 907 to be presented to the user. After 909, this process concludes.

Figure 10:
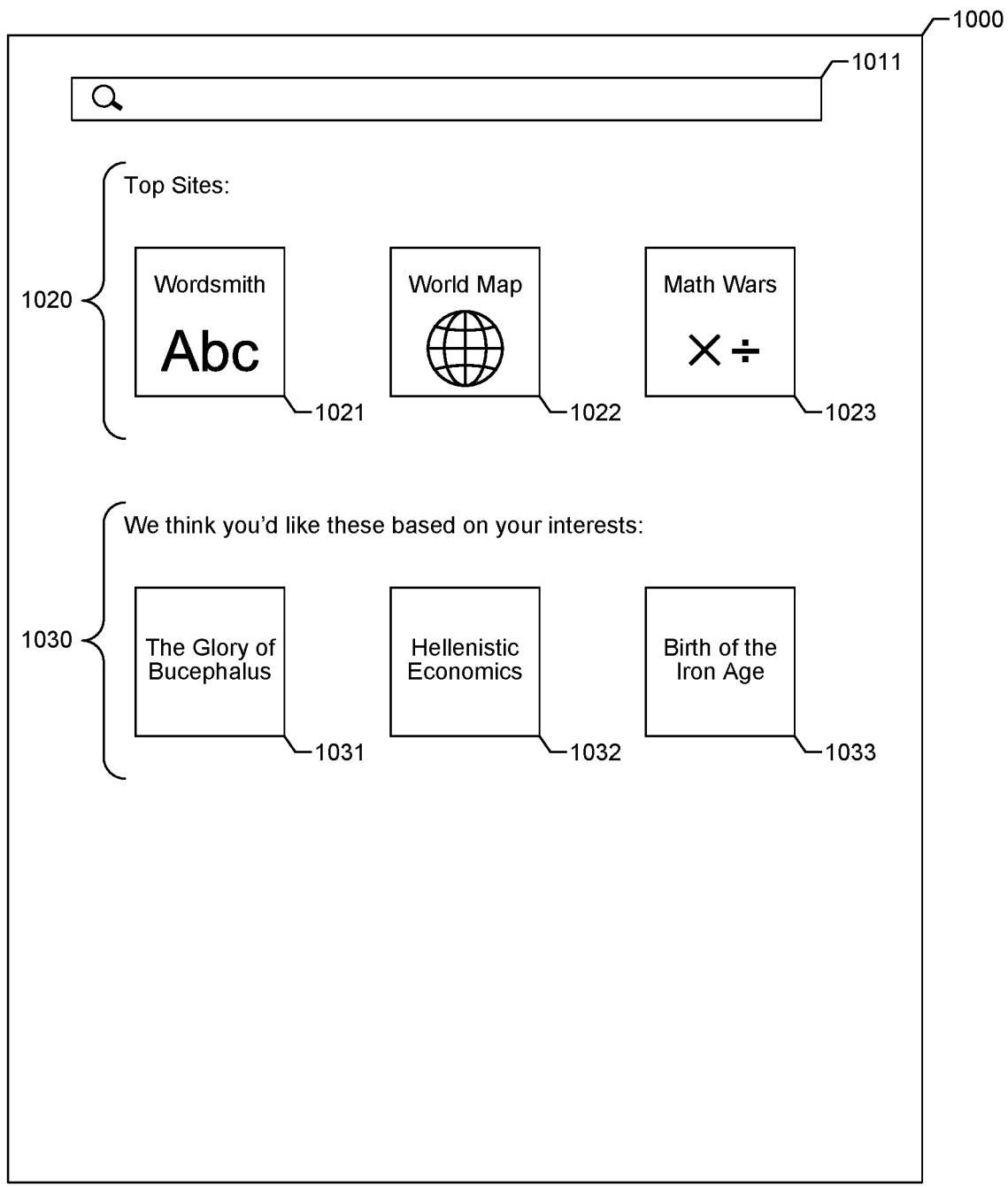
FIG. 10 is a display diagram showing a sample user interface presented by the facility in some examples to recommend to a user documents chosen by the facility for that user.

FIG. 10 is a display diagram showing a sample user interface presented by the facility in some examples to recommend to a user documents chosen by the facility for that user. FIG. 10 shows an application window 1000, such as a browser window. Those of ordinary skill in the art will appreciate that, in various examples, the facility can present document recommendations in a wide variety of contexts, including application or document windows for applications of other types; messages, such as email, text, or chat messages; message board postings; lists, tables, card decks, albums, or toasts; calendar entries; etc.

The application window includes a query box 1011 into which a user can enter a query string in order to search for a document containing or otherwise relating to the query string. Application window further contains, among other information, a document recommendations section 1030, which in turn includes visual indications 1031-1033 of three documents chosen by the facility to recommend to the current user in the way described above. The user can interact with these visual indications of documents in various ways to take various actions with respect to the corresponding document, such as opening the document for visual reading, opening the document for text-to-speech reading; opening the document for revision, creating a bookmark for the document, adding the document to a reading list, etc.

In some examples (not shown), the facility displays a list of categories for which documents are recommended and permits the user to select one; in response, the facility displays visual indications of only the recommended documents associated with the selected category.

In some examples (not shown), the facility displays visual indications of recommended documents in such a way that the visual indications of documents recommended for each category are grouped together, in some cases under a heading identifying the category.

In some examples (not shown) the facility displays visual indications of recommended documents using different formatting properties for the visual indications of documents recommended for each category, such as displaying the visual indications with borders whose color denotes category, borders whose pattern denotes category, etc.

In some examples, the facility provides a method in a computing system for recommending documents to a selected user, comprising: for each of a plurality of documents interacted with by the selected user: identifying a plurality of named entities whose names each occur in the document; for each of the identified named entities: obtaining an entity relationship graph representing relationships between the identified named entity and named entities directly or indirectly related to the identified named entity, the identified named entity occurring as a root of the entity relationship graph; within the obtained entity relationship graphs, selecting a named entity based at least in part on (1) the percentage of the obtained entity relationship graphs that contain the selected named entity and (2) in the obtained entity relationship graphs that contain the selected named entity, the average distance of the selected named entity from the root; determining an intensity level of the selected user's interactions with the document; based at least in part on (1) a number of documents for which each named entity was selected and (2) an average intensity level with which the selected user interacted with the documents for which the named entity was selected, choosing a subset of the selected named entities; for each of the subset of named entities, choosing from a corpus of documents one or more documents for which the named entity was selected, each interacted with by one or more users among a population of users, based at least in part on (1) a number of users among the population of users who interacted with each of the documents and (2) an average intensity level with which users among the population of users interacted with each of the documents; and causing to be presented to the selected user information recommending at least a portion of the documents chosen from the corpus.

In some examples, the facility provides one or more memories collectively having contents adapted to cause a first computing system to perform a method for recommending documents to a selected user, comprising: for each of a plurality of documents interacted with by the selected user: identifying a plurality of named entities whose names each occur in the document; for each of the identified named entities: obtaining an entity relationship graph representing relationships between the identified named entity and named entities directly or indirectly related to the identified named entity, the identified named entity occurring as a root of the entity relationship graph; within the obtained entity relationship graphs, selecting a named entity based at least in part on (1) the percentage of the obtained entity relationship graphs that contain the selected named entity and (2) in the obtained entity relationship graphs that contain the selected named entity, the average distance of the selected named entity from the root; determining an intensity level of the selected user's interactions with the document; based at least in part on (1) a number of documents for which each named entity was selected and (2) an average intensity level with which the selected user interacted with the documents for which the named entity was selected, choosing a subset of the selected named entities; for each of the subset of named entities, choosing from a corpus of documents one or more documents for which the named entity was selected, each interacted with by one or more users among a population of users, based at least in part on (1) a number of users among the population of users who interacted with each of the documents and (2) an average intensity level with which users among the population of users interacted with each of the documents; and causing to be presented to the selected user information recommending at least a portion of the documents chosen from the corpus.

In some examples, the facility provides one or more memories collectively having contents adapted to cause a first computing system to perform a method for choosing documents for recommendation to people interested in a distinguished subject, the method comprising, in the first computing system: accessing a data resource indicating, for each of a plurality of documents, (1) a subject semantically determined for the document, (2) a number of people who have interacted with the document, and (3) an aggregate level of intensity with which those people have interacted with the document; based on contents of the data structure, identifying one or more documents (1) for which the distinguished subject has been semantically determined, and (2) with which a relatively large number of people have interacted and or with which people have interacted with a high aggregate level of intensity; and transmitting to a second computing system distinct from the first computing system data configured to cause the first computing system to present a recommendation for some or all of the identified documents.

In some examples, the facility provides a method in a first computing system for choosing documents for recommendation to people interested in a distinguished subject, the method comprising, in the first computing system: accessing a data resource indicating, for each of a plurality of documents, (1) a subject semantically determined for the document, (2) a number of people who have interacted with the document, and (3) an aggregate level of intensity with which those people have interacted with the document; based on contents of the data structure, identifying one or more documents (1) for which the distinguished subject has been semantically determined, and (2) with which a relatively large number of people have interacted and or with which people have interacted with a high aggregate level of intensity; and transmitting to a second computing system distinct from the first computing system data configured to cause the first computing system to present a recommendation for some or all of the identified documents.

In some examples, the facility provides one or more memories collectively storing a data structure, the data structure comprising: a plurality of first entries, each first entry comprising: information identifying a document interacted with by a distinguished user; information identifying a subject semantically determined for the identified document; and an interaction intensity score characterizing intensity of one or more interactions performed by the distinguished user with respect to the identified document, such that the contents of the data structure can be used to select one or more subjects, each selected subject being determined for relatively large number of documents identified among the first entries, the interaction intensity scores for the documents for which each selected subject was determined collectively reflecting a relatively high level of intensity.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A method in a computing system for recommending documents to a selected user, comprising:
   for each of a plurality of documents interacted with by the selected user:
      identifying a plurality of named entities whose names each occur in the document;
      for each of the identified named entities:
      observing the selected user's interactions with the document, and determining an interaction intensity score for the selected user based on the selected user's observed interactions with the document;
   based at least in part on (1) a number of documents for which each named entity was selected and (2) an average interaction intensity score for the documents for which the named entity was selected, selecting a subset of the identified named entities;
   for each of the subset of selected named entities, choosing from a corpus of documents one or more documents for which the named entity was selected, each interacted with by one or more users among a population of users, based at least in part on (1) a number of users among the population of users who interacted with each of the documents and (2) an average interaction intensity score for users among the population of users for each of the documents; and
   causing to be presented to the selected user information recommending at least a portion of the documents chosen from the corpus.

2. The method of claim 1 wherein a proper subset of the selected named entities are chosen.

3. The method of claim 1 wherein a proper subset of the documents for which the named entity was selected, each interacted with by one or more users among the population of users are chosen.

4. The method of claim 1, further comprising, for each of the identified named entities:
   obtaining an entity relationship graph representing relationships between the identified named entity and named entities directly or indirectly related to the identified named entity, the identified named entity occurring as a root of the entity relationship graph; and
   within the obtained entity relationship graphs, selecting a named entity based at least in part on (1) the percentage of the obtained entity relationship graphs that contain the selected named entity and (2) in the obtained entity relationship graphs that contain the selected named entity, the average distance of the selected named entity from the root, wherein named entities are selected that (1) are contained by a relatively high percentage of the obtained entity relationship graphs and (2) in the obtained entity relationship graphs that contain the selected named entity, have a relatively low average distance from the root.

5. The method claim 1 wherein selected named entities are chosen that (1) were selected for a relatively high number of documents and (2) were selected in documents with which the selected user interacted with a relatively high average interaction intensity score.

6. The method claim 1 wherein documents for which the current named entity was selected are chosen from the corpus that were interacted with (1) by a relatively high number users among the population of users and (2) with a relatively high average interaction intensity score.

7. The method of claim 1 wherein, for each of the plurality of documents, an interaction intensity score based on the selected user's interactions with the document is determined at least in part based on a type of interaction the user performed with respect to the document.

8. The method of claim 1 wherein, for a distinguished one of the plurality of documents, an interaction intensity score based on the selected user's interactions with the document is determined based on performing, with respect to the document, an opening interaction, a reading interaction, a scrolling interaction, a bookmarking interaction, an add-to-reading-list interaction, an annotation interaction, or a sharing interaction.

9. The method of claim 1 wherein, for each of the plurality of documents, an interaction intensity score based on the selected user's interactions with the document is determined at least in part based on an amount of time for which the user performed interactions with respect to the document.

10. One or more memories collectively having contents adapted to cause a first computing system to perform a method for choosing documents for recommendation to people interested in a distinguished subject, the method comprising, in the first computing system:
   accessing a data resource indicating, for each of a plurality of documents, (1) a subject semantically determined for the document, (2) a number of people who have interacted with the document, and (3) an aggregate interaction intensity score based on the interactions with the document by those people;

based on contents of the data structure, identifying one or more documents for which the distinguished subject has been semantically determined, and:
 a) with which a relatively large number of people have interacted, or
 b) having a high aggregate interaction intensity score for the interactions, or
 c) with which a relatively large number of people have interacted and having a high aggregate interaction intensity score for the interactions; and transmitting to a second computing system distinct from the first computing system data configured to cause the first computing system to present a recommendation for some or all of the identified documents.

11. The computer-readable medium of claim 10, the method further comprising:
 receiving from the second computing system a synchronization request, the synchronization request specifying, for a person associated with the second computing system, a document with which the associated person has interacted and a interaction intensity score based on the interaction with that document by the associated person; and
 based at least in part on the receiving, altering the data resource to reflect the contents of the synchronization request.

12. The computer-readable medium of claim 11 wherein, before the altering, the data resource reflected a different interaction intensity score for the specified document for the associated person.

13. The computer-readable medium of claim 11 wherein, before the altering, the data resource did not reflect that the associated person interacted with the specified document.

14. The computer-readable medium of claim 10 wherein the data resource comprises a separate entry for each unique combination of person and document.

15. The computer-readable medium of claim 10, the method further comprising:
 for a first document for which a first subject has been semantically determined:
  based on contents of the information resource, determining that, of the people who have interacted with the first document, significantly more have interacted with a relatively high interaction intensity score with documents other than the first document for which a second subject distinct from this first subject has been semantically determined than with documents other than the for which the first subject has been semantically determined; and
  based at least in part on the determining, altering the data resource to reflect that the second subject is the subject of the first document.

* * * * *